United States Patent
Moorehead et al.

(10) Patent No.: US 10,028,428 B2
(45) Date of Patent: Jul. 24, 2018

(54) CONTROL SYSTEM AND METHOD FOR AUTOMATICALLY DETERMINING CHARACTERISTIC FOR OPTIMUM MACHINE PERFORMANCE

(71) Applicant: Deere & Company, Moline, IL (US)

(72) Inventors: Stewart J. Moorehead, Champaign, IL (US); Charles Conway, Champaign, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/371,347

(22) Filed: Dec. 7, 2016

(65) Prior Publication Data

US 2018/0153092 A1 Jun. 7, 2018

(51) Int. Cl.
*A01C 7/10* (2006.01)
*A01C 7/04* (2006.01)

(52) U.S. Cl.
CPC .............. *A01C 7/102* (2013.01); *A01C 7/046* (2013.01)

(58) Field of Classification Search
CPC ................................ A01C 7/102; A01C 7/046
USPC ........................................................... 701/50
See application file for complete search history.

(56) References Cited

U.S. PATENT DOCUMENTS

| | | | |
|---|---|---|---|
| 5,996,516 A | 12/1999 | Benneweis et al. | |
| 6,144,910 A | 11/2000 | Scarlett et al. | |
| 6,644,225 B2 | 7/2003 | Keaton | |
| 7,478,603 B2* | 1/2009 | Riewerts | A01C 7/046 111/200 |
| 8,001,914 B2 | 8/2011 | Peterson et al. | |
| 8,161,718 B2* | 4/2012 | Bussmann | A01D 41/127 56/10.2 G |
| 9,313,943 B2* | 4/2016 | Zumdome | A01C 7/046 |
| 2009/0118910 A1 | 5/2009 | Carr et al. | |
| 2010/0217481 A1* | 8/2010 | Baumgarten | A01D 41/127 701/33.4 |
| 2016/0007523 A1 | 1/2016 | Rylander | |
| 2016/0055688 A1* | 2/2016 | Miura | G06Q 50/02 340/870.11 |
| 2016/0078391 A1* | 3/2016 | Blank | G06Q 10/06398 705/7.42 |

FOREIGN PATENT DOCUMENTS

| | | |
|---|---|---|
| EP | 2047735 A1 | 4/2009 |
| WO | 2015077743 A1 | 5/2015 |

OTHER PUBLICATIONS

European Search Report issued in counterpart application No. 17201856.6 dated May 7, 2018. (9 pages).

* cited by examiner

*Primary Examiner* — Tyler J Lee

(57) ABSTRACT

A control system and method for automatically determining characteristic for optimum machine performance including a user interface console, a processor and a controller. Data for operation setting and optimization condition is fed into the control system through the user interface console. The processor processes the data by incrementing at least one variable parameter to generate an output data corresponding to each incremented variable parameter.

15 Claims, 6 Drawing Sheets

CONTROL SYSTEM AND METHOD FOR AUTOMATICALLY DETERMINING CHARACTERISTIC FOR OPTIMUM MACHINE PERFORMANCE

TECHNICAL FIELD

The present invention relates generally to an agricultural seeding machine such as a planter and, more specifically, to determining an optimum planter parameter.

BACKGROUND

Seed planters may be used to plant seeds into rows of a field. Whether towed or part of the tractor or other machine, seed planters dispense seeds at a controlled rate into one or more seed furrows or rows as the planter moves along a field. Seed planters typically have several planting or row units in a spaced-apart arrangement such that several rows can be simultaneously planted.

The planting or row units may include one or more seed hoppers that hold seeds. The seed hopper holds a seed supply that feeds a seed meter. In turn, a seed meter may control the rate at which seeds are dispensed as the seed planter traverses a field. Each planting or row unit may also include other equipment, such as a furrow opener and/or a furrow closer, or other equipment.

The seed meters may use a variety of different mechanical principles to control how seeds are dispensed, but generally all seed meters are designed to dispense seeds at a controlled rate, often one seed at a time. However, seed meters will have occasional errors, for example, "doubles" in which multiple seeds are dispensed when only one seed is intended to be dispensed, or "skips" in which no seed is dispensed when a seed is intended to be dispensed.

One particular type of seed meter is known as a vacuum seed meter. A vacuum seed meter uses a vacuum to control how seeds are taken from a seed pool and are dispensed from the meter. In one specific example, a vacuum seed meter may use a vacuum to gently pull and hold individual seeds in seed apertures defined on a seed metering member, such as, a seed disk. Vacuum is applied to the non-seed side of the disc to draw seeds into the apertures on the seed side. An alternative is to apply positive pressure on the seed side to push seeds onto the apertures. In either case, the meter operates by a pressure differential on the opposite sides of the disc. The seed metering member then rotates, and at a designated position during rotation, the seed is released from the seed disk and dispensed for planting. A vacuum seed meter may include a double eliminator configured to remove doubles at individual seed apertures of the seed disk.

Thus, vacuum level plays a critical role in determining accuracy of the vacuum seed-meter, which means elimination of doubles and skips. The required vacuum level is dependent on several parameters which include the type of seed to be sowed, the seed population and a planter operational speed. Currently, the vacuum level is changed by the operator based on experience with regard to the type of seed along with other parameters. Alternatively, the operator manually adjusts the vacuum level until the best singulation performance is achieved. This takes a substantial amount of time and leads to several skips and multiples before arriving at a vacuum level optimum for singulating seeds.

SUMMARY

A control system for automatically determining characteristic for optimum machine performance is provided. The operator is required to input data pertaining to operation settings and optimization conditions into the control system. At least one of the optimization conditions is a variable parameter. A range of value is provided by the operator for the variable parameter. The control system increments the value of the variable parameter by a predefined increment step size until the maximum value of the variable parameter is achieved. The control system processes the machine performance for each value of the variable parameter. Thereafter, the degree of seed singulation corresponding to each vacuum level is displayed by the control system. The operator is required to select the optimum degree of seed singulation, based on experience or as indicated by the control system.

Various other embodiments are contemplated, within the scope of the discussion herein.

BRIEF DESCRIPTION OF THE DRAWINGS

The detailed description of the drawings refers to the accompanying figures in which.

Like reference symbols in the various drawings indicate like elements.

DETAILED DESCRIPTION OF THE DRAWINGS

Figure 1:
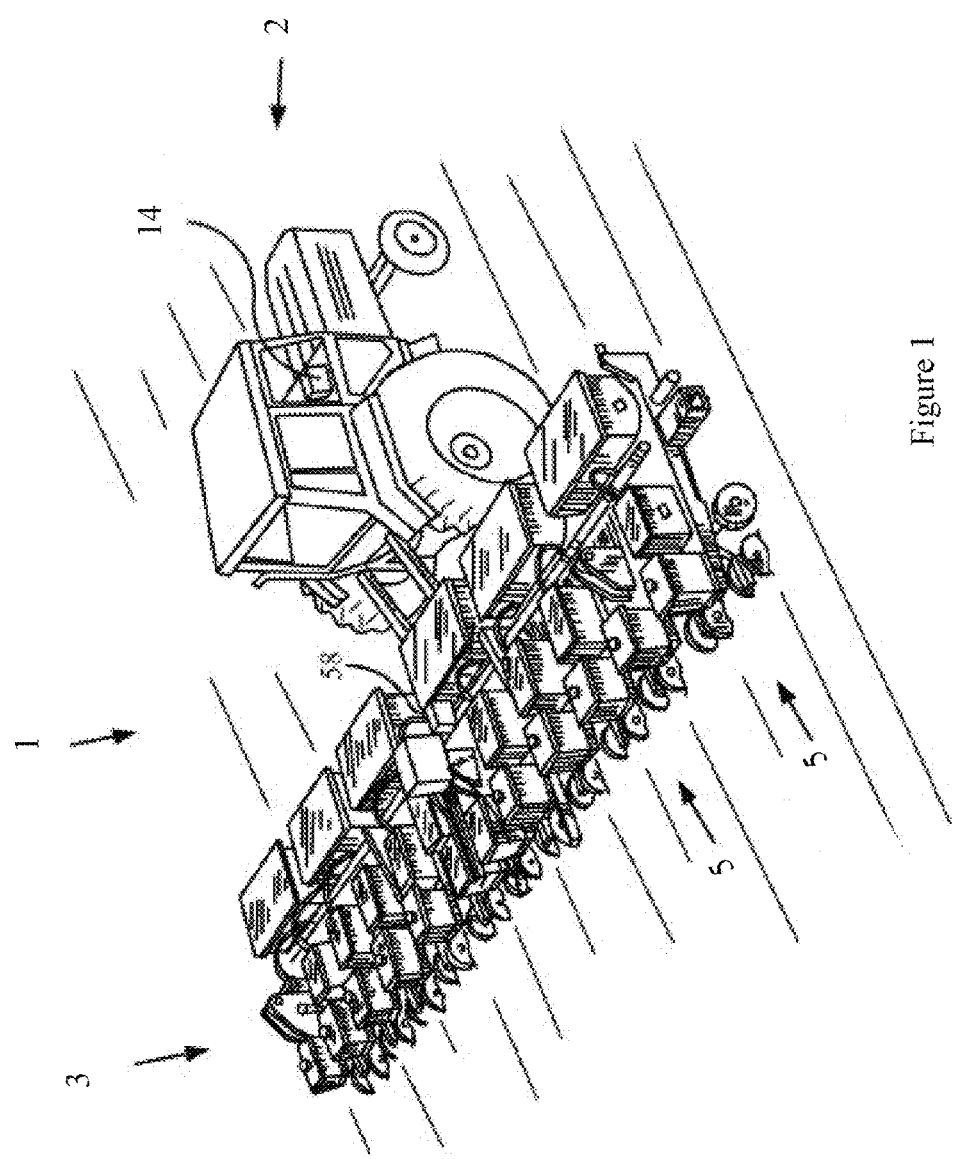
FIG. 1 illustrates a perspective view of a planter incorporating an embodiment of a control system, in accordance with the present disclosure.
Figure 2:
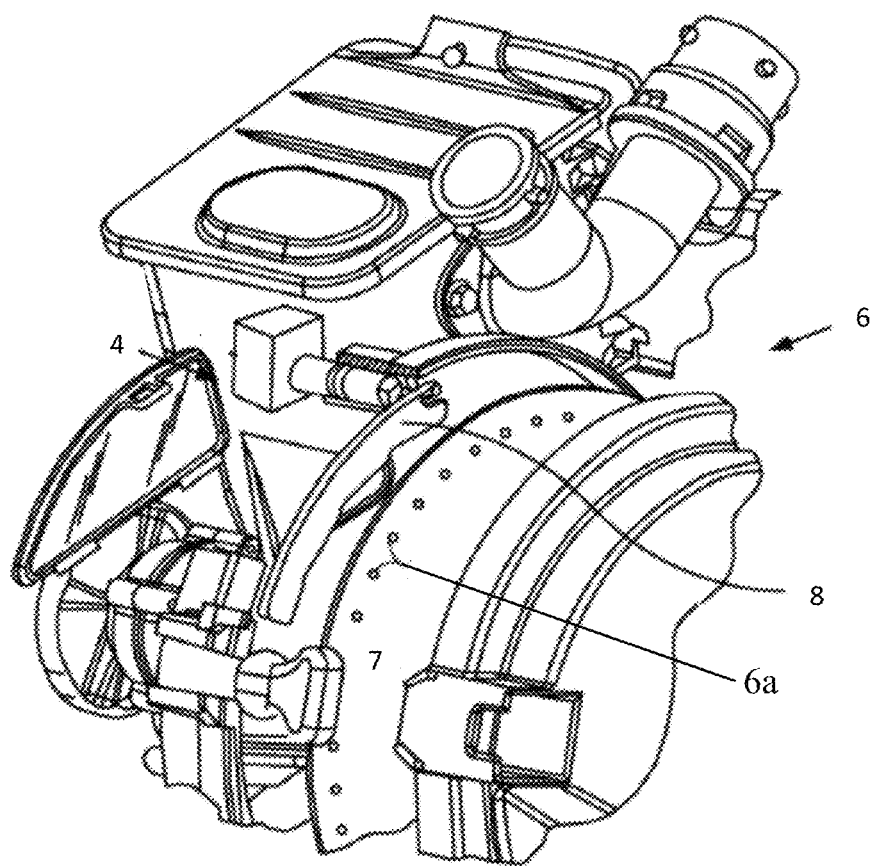
FIG. 2 illustrates a perspective partially exploded view of a seed meter of the planter.

The following describes one or more exemplary embodiments of the disclosed system and method for automatically determining characteristics for optimum seed singulation, as shown in the accompanying figures of the drawings described briefly above. Various modifications to the example embodiments may be contemplated by one of skill in the art. Referring now to the drawings, and more particularly to FIG. 1, there is shown an agricultural system 1 including a tractor 2 and seeding machine, such as, a planter 3. The seeding machine 3 is in the form of a row crop planter 3, but could be a grain drill. The tractor 2 provides the motive power for planter 3 and the mechanisms therein. A monitoring system is incorporated and used by the operator of tractor 2 to monitor the placing of seeds, from planter 3. An adjusting system 4 allows the control system to alter the retention of seeds in a metering system in planter 3. The planter 3 includes a tool bar (not shown in Figure), seed supply (not shown in Figure) and row units 5. FIG. 2 illustrates a perspective partially exploded view of the seed meter 6 used in the planter 3. Each row unit 5 includes a seed meter 6 having a seed disk 7 with holes 6a therein and a double eliminator 8.

Figure 3:
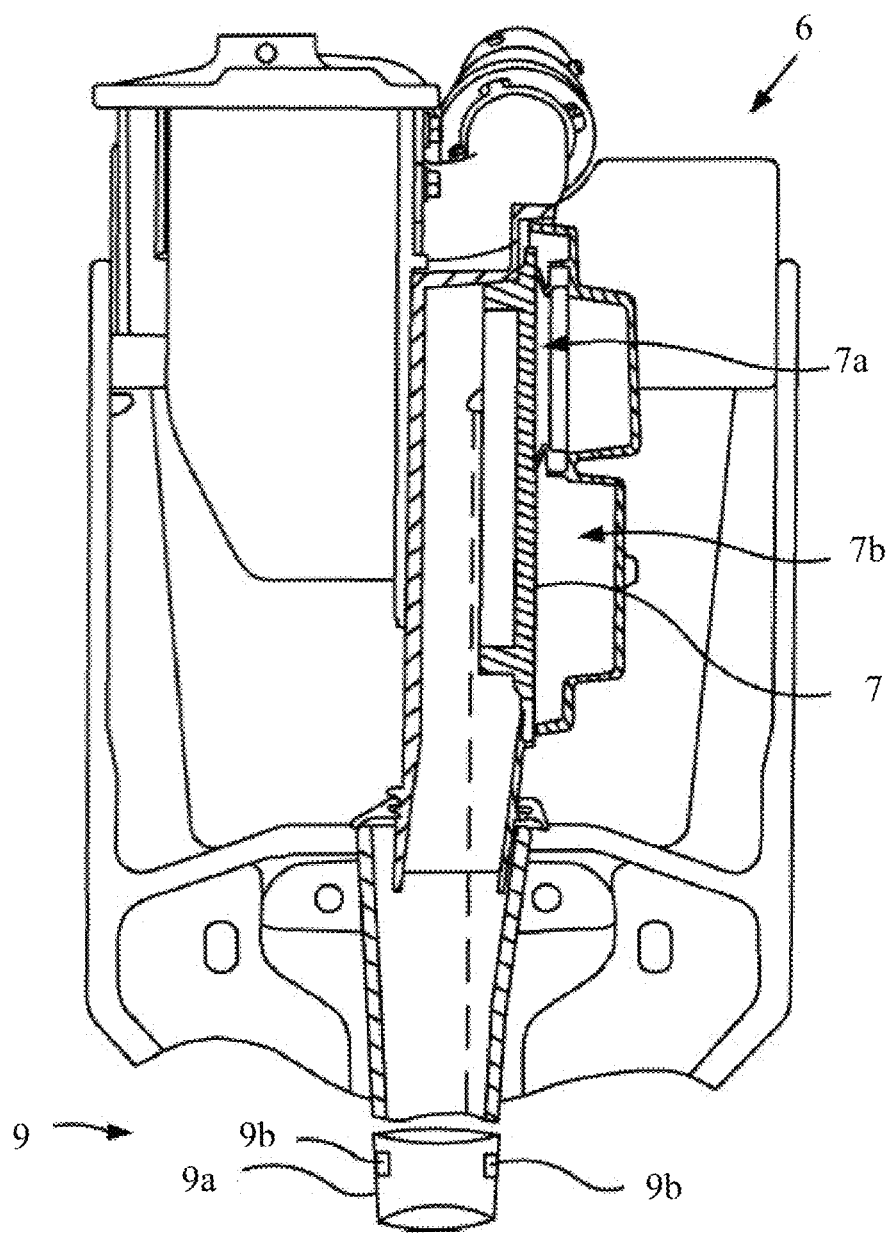
FIG. 3 illustrates a partially sectioned view of the seed meter of FIG. 2.

FIG. 3 illustrates a partially sectioned view of the seed meter 6. The seed meter 6 are coupled with tractor 2. Seed is supplied to seed meter 6 by way of seed supply and the seed is pooled over a portion of seed disk 7. Seed disk 7 is fluidly coupled to an airflow generator that supplies airflow to the cavities 7a and 7b. The airflow generator may have an adjustable airflow that is under the control of adjusting system 4. The airflow generator may produce a positive or negative pressure depending on the configuration of planter 14, for ease of explanation the airflow will be understood to be a vacuum system. Airflow caused by the vacuum system is supplied to cavities 7a and 7b and thereby to one side of seed disk 7 causing air to flow through holes 6a. The air flowing through holes 6a attracts seeds thereto as seed disk 7 is rotated through the pooled seeds in the seed meter 6. Seeds are connected with holes 6a and rotate from the pooled seeds to a point of discharge, as illustrated by a dashed line in FIG. 3, from the seed meter 6 so that it may travel, by way of a seed placement system 9, to the prepared trench in the soil. As the seed departs from seed meter 6, flows through a seed tube 9a and is sensed by seed sensor 9b, as illustrated in FIG. 3, a signal is generated by seed sensor 9b that is sent to an electronic processing circuit that may be in a monitoring system which communicates with the control system.

Figure 4:
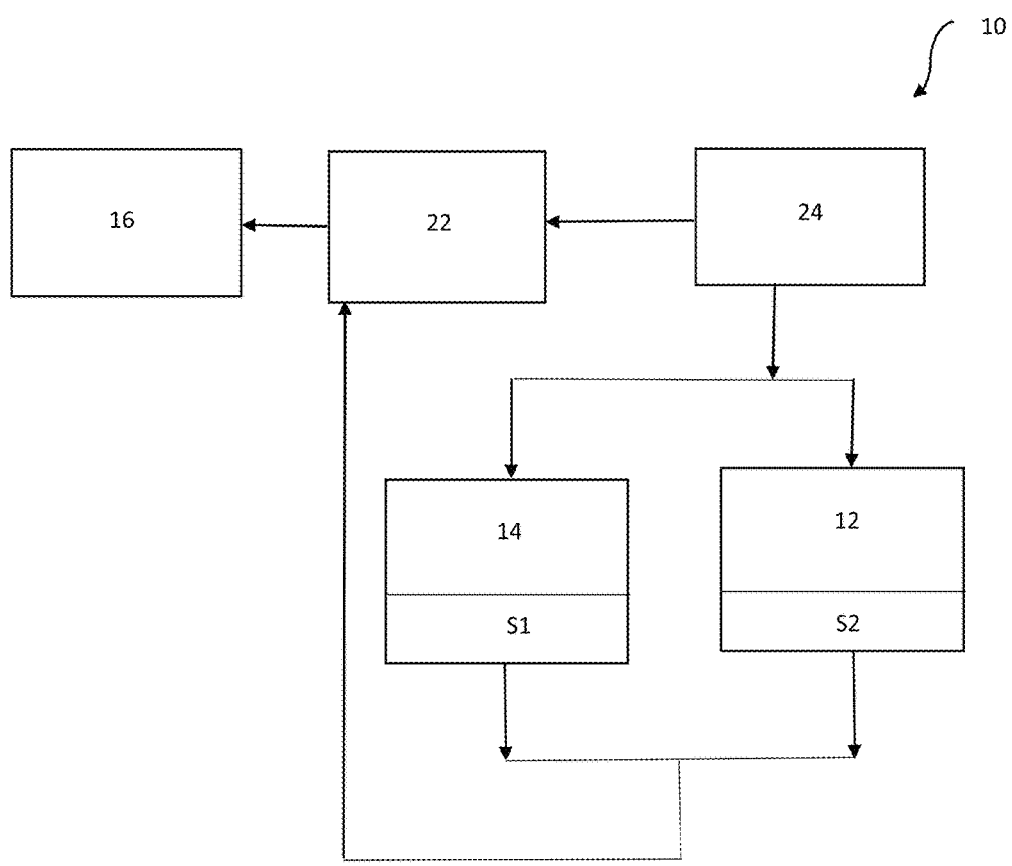
FIG. 4 schematically illustrates a control system for automatically determining characteristics for optimum seed singulation.

FIG. 4 schematically illustrates the control system for automatically determining characteristics for optimum seed singulation. The control system for automatically determining characteristics for optimum seed singulation is generally referenced the numeral 10 and will be henceforth referred to as the control system 10. Although, the control system 10 will henceforth be described as with respect to the seed meter 6, however a person ordinarily skilled in the art would appreciate that control system 10 can be used for any other applications, such as, a work machine. The seed meter 6 will hence forth be described with respect to a vacuum seed meter. A singulation mechanism 12 is associated with the seed metering member, such as, a double eliminator. The singulation mechanism 12 is configured to be adjustable to effect the degree of seed singulation. The degree of singulation is determined considering the number of singulated seed, number of multiples and the number of skips. The control system 10 enables optimum vacuum level required corresponding to optimum seed singulation from a vacuum seed-meter. The required vacuum level is generated by the vacuum pump 14. The criteria for the acceptable percentage of skips and doubles can be input into control system 10 and doubles eliminator 8 and/or the airflow to a specific seed meter 6 is adjusted by the adjusting system 4 based on at least one operational data. The control system 10 includes a user interface console 16, a processor 22 and a controller 24.

Figure 5:
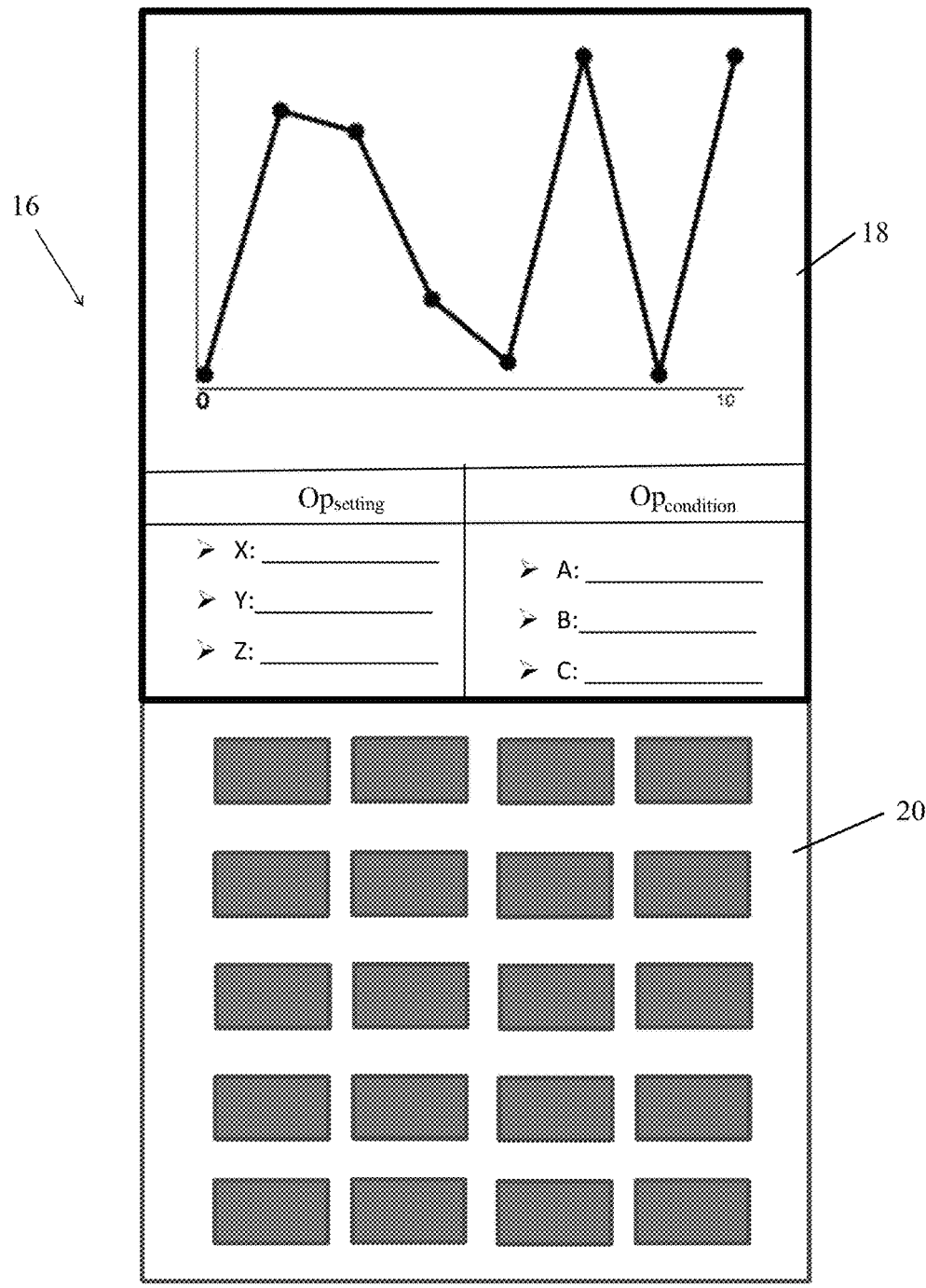
FIG. 5 schematically illustrates an instrument console, in accordance the present disclosure.

FIG. 4 and FIG. 5 particularly illustrates a schematic diagram of the user interface console 16. The user interface console 16 includes a display 18 and a data input device 20. The display 18 is configured to display to the operator a plurality of operational data to be entered for operation of the control system 10. The operator is required to initiate the control system 10 by entering the operational data into the control system 10 via the user interface console 16. The operational data includes data for operation setting ($OP_{setting}$) and optimization condition ($Op_{condition}$). The operation setting ($OP_{setting}$) includes data pertaining to planter travel speed, seed population as well as seed type. The optimization condition ($Op_{condition}$) includes data, such as, range of vacuum levels, an increment step size and a sensitivity value. The vacuum level ranges from a minimum vacuum level $V_{min}$ and a maximum vacuum level $V_{max}$. The increment step size indicates the step through which the vacuum level is required to be incremented between the minimum vacuum level $V_{min}$ and the maximum vacuum level $V_{max}$. The sensitivity value, with regards to vacuum level as well as seed singulation value, may be entered into the control system 10 through the user interface console 16. Alternatively, the sensitivity value may be programmed into the controller 24. The sensitivity value is used to determine when the measured vacuum level, as measured by sensor S1, and measured singulation value, as measured by sensor S2, have reached steady state values. The processor 22 sends a signal to the controller 24 corresponding to the vacuum level and the corresponding sensitivity values required by the operator. The processor generates input signals corresponding to minimum vacuum level $V_{min}$ and each subsequent vacuum level until the maximum vacuum level $V_{max}$ is achieved. The input signals from the processor 22 is transmitted to the controller 24. The controller 24 generates controlling signals which are transmitted to the vacuum pump 14 and a singulation mechanism 12. The position of the singulation mechanism 12 is adjusted corresponding to the controlling signals transmitted by the controller 24. This changes the degree of singulation. Sensors S1 and S2 are associated with the vacuum pump 14 and a singulation mechanism 12 respectively. The sensor S1 senses the vacuum level while the sensor S2 senses the degree of seed singulation. The control system 10 processes output data of the seed-meter. The output data is determined in terms of the degree of seed singulation for each vacuum level between the minimum vacuum level $V_{min}$ and the maximum vacuum level $V_{max}$. The output data of the seed-meter depends on the data for operation setting ($OP_{setting}$) and optimization condition ($Op_{condition}$).

Each of the output data is displayed on the display 18. The output data includes the degree of singulation for each vacuum level starting from the minimum vacuum level $V_{min}$ and incremented up to the maximum vacuum level $V_{max}$. The processor 22 also plots a graph of the degree of seed singulation vs. the vacuum levels. The graph is displayed on the display 18 and the vacuum level corresponding to the maximum singulation is selected. Alternatively, the operator can select an optimum output data from of the output data displayed for each vacuum level between the minimum vacuum level $V_{min}$ and the maximum vacuum level $V_{max}$. The processor 22 may alternatively be configured to automatically select the optimum output for optimum seed singulation. On selection of the optimum output data, the parameters of the seed meter 6 is set to sow seeds with the optimum degree of seed singulation.

Figure 6:
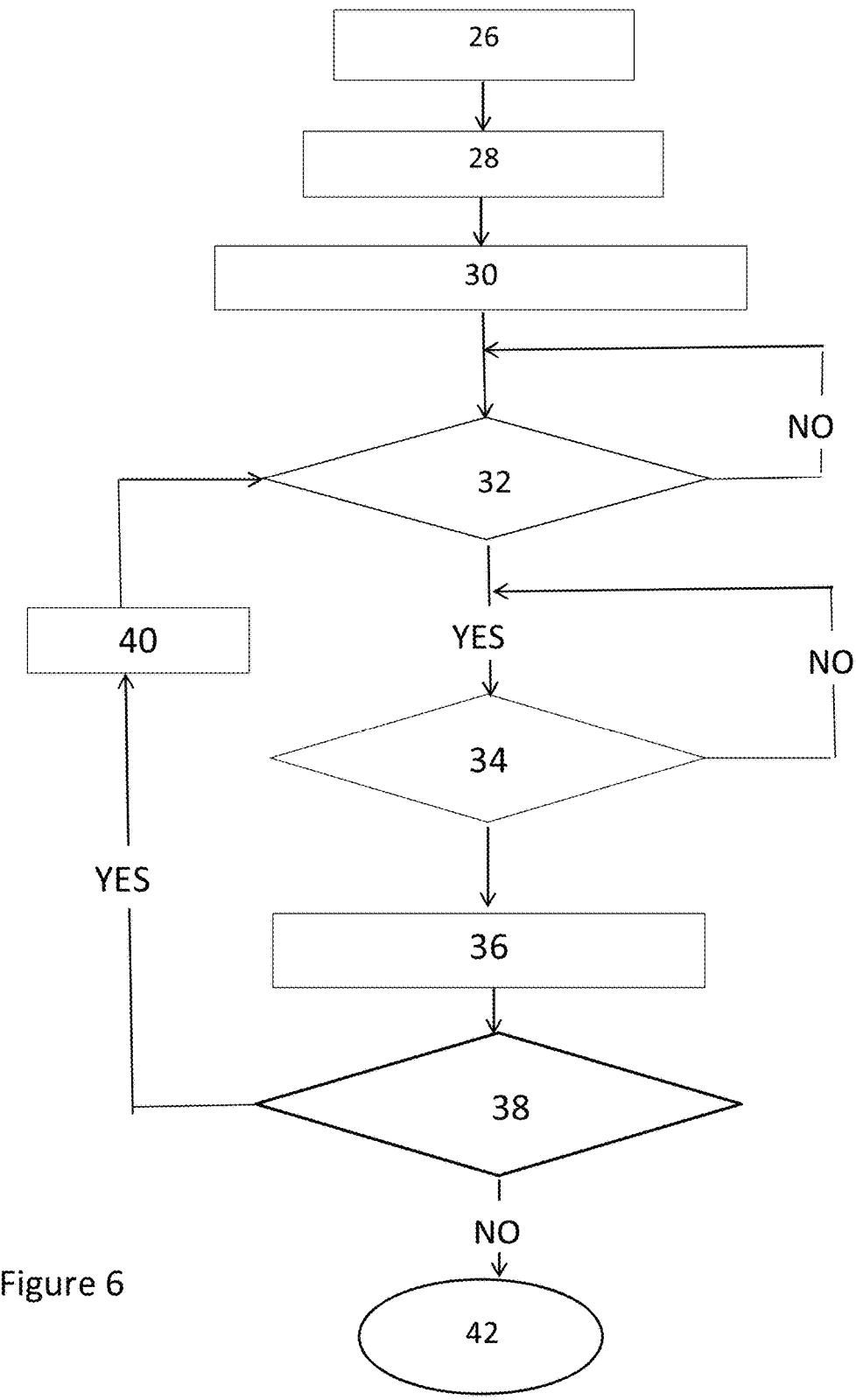
FIG. 6 illustrates a flow diagram depicting operation of the control system, illustrated in FIG. 4.

Referring to FIG. 6, a flow chart depicts the steps performed by the control system 10, illustrated in FIG. 4. The operation of the control system 10, begins with the first step 26 of setting planter for row run-off. This includes inputting the data for operation setting ($OP_{setting}$). Once the operation setting ($OP_{setting}$) is entered into the control system 10, the optimization condition ($Op_{condition}$) is required to be entered. The optimization condition ($Op_{condition}$) includes the range of vacuum levels, an increment step size and a sensitivity value range of vacuum levels. Thus, the second step 28 includes the step of setting up vacuum sweep parameter. The control system 10 is initiated by the third step 30 of triggering the vacuum sweep, whereby the vacuum pump is triggered to provide a vacuum starting from the minimum vacuum level $V_{min}$ and incremented upto the maximum vacuum level $V_{max}$ through the increment step size provided. In the fourth step 32, the control system 10 will continuously check the steady state of the vacuum level. Thus, the control system 10 at each vacuum level, for example, at the minimum vacuum level $V_{min}$, will check for steady state of the vacuum until the vacuum level settles to the minimum vacuum level $V_{min}$. The vacuum level will likely oscillate above and below the target level. The sensitivity value is a threshold on the oscillations; a plus and minus tolerance around the target vacuum. When these oscillations are within the sensitivity value, the vacuum level is determined to be settled. If the sensitivity value is too great, the vacuum level will be oscillating too much for accurate results. If the sensitivity value is too small, the settling process takes an undue amount of time or is never reached, preventing the process from continuing.

Once the vacuum level is settled, the control system 10 then checks the degree of seed singulation in the fifth step 34. Once the seed singulation settles to a steady state, the control system 10 displays the degree of seed singulation for the minimum vacuum level $V_{min}$. The control system 10 then determines in step 38 whether or not the current vacuum level plus the increment step size is less than or equal to $V_{max}$. If yes, the control system terminates the process in step 42. If no, the process continues at step 40 by increasing the vacuum level by the increment step size and returning to step 32 where the control system 10 will continuously check the steady state of the vacuum level.

For example, if
the minimum vacuum level $V_{min}$=14 inches of water;
the maximum vacuum level $V_{max}$=22 inches of water; and
the increment step size=0.5,
then the control system 10 initiates with vacuum level at 14 inches of water. On processing the output of the seed-meter for $V_{min}$, that is, 14 inches of water, the control system 10 will increment the vacuum level by increment step size. As the increment step size provided in the above example is 0.5, the processor 22 increments the vacuum level by 0.5 from the last vacuum level which is the minimum vacuum level $V_{min}$ of 14 inches of water. Thus, the incremented vacuum level changes to 14.5 inches of water. The processor 18 will send signal to the controller 24 which will transmit controlling signals to the vacuum pump 14 and the singulation mechanism 12. The control system similarly processes the degree of seed singulation for the incremented vacuum level of 14.5 inches of water.

The control system 10 continues to increment the vacuum level and generate the corresponding degree of seed singulation. The control system 10 checks whether the incremented vacuum level is less than the maximum vacuum level $V_{max}$. If the incremented vacuum level is less than the maximum vacuum level $V_{max}$, then the control system 10 will continue to increment the vacuum level and process the corresponding degree of seed singulation. When the incremented value of the vacuum level reaches or exceeds the maximum vacuum level $V_{max}$, the control system 10 stops and the degree of seed singulation for each vacuum level is displayed on the display 18 of the user interface console 16, illustrated in FIG. 5.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

Accordingly, various embodiments and implementations other than those explicitly described are within the scope of the following claims.

What is claimed is:

1. A control system for automatically determining a work machine characteristic for optimum work machine performance, said control system comprising:
   a user interface console having a display and a data input device for entering data including at least one operation setting and at least one optimization condition that is a variable parameter;
   a processor responsive to said at least one optimization condition and said at least one operation setting, said processor configured to increment the value of the variable parameter of the at least one of said optimization condition to generate a set of controlling signals;
   a controller sequentially transmitting each of said controlling signals to at least one mechanism; and
   at least one sensor sensing a set of measure of performances of said mechanism corresponding to each of said controlling signals, said measure of performances being displayed on said user interface console for selection thereof,
   wherein said measures of the work machine performance being displayed on said user interface console for selection thereof.

2. The control system as claimed in claim 1, wherein the operation settings include at least one of the parameters to be fixed for the work vehicle during operation thereof.

3. The control system as claimed in claim 1, wherein the optimization process conditions include at least one of range of values for said variable operating parameter, an increment step size and a sensitivity value of the variable operating parameter.

4. The control system as claimed in claim 1, wherein said controller selects at least one of said measure of performance corresponding to an optimum parameter, said selected measure of work machine performance being displayed on said user interface console.

5. The control system as claimed in claim 1, wherein said user interface console displays each of said measure of work machine performance.

6. The control system as claimed in claim 1, wherein a user selects one of said measure of work machine performance corresponding to the optimum parameter.

7. A control system for automatically determining an optimum characteristic for optimum seed singulation of a planter, the planter having plurality of row units, at least one seed meter associated with each of said row units, each said seed meter including a housing defining an enclosed space accommodating a seed pool, a seed metering member rotatably mounted within said housing, said seed metering member defining cavities for transferring individual seeds from the seed pool to a discharge location, and at least one optimization condition that is a variable operating parameter having an operation setting, said control system comprising:
   a user interface console having a display and a data input device for entering data including at least one operation setting and at least one optimization condition;

a processor responsive to said entered at least one optimization condition and said at least one operation setting, said processor configured to increment the value of the variable parameter of at least one of said optimization condition to generate a set of controlling signals;

a controller sequentially transmitting each of said controlling signals to at least one mechanism; and at least one sensor functionally cooperating with said at least one mechanism, said sensor sensing a set of measures of the planter performance corresponding to each of said controlling signals, wherein said measures of the planter performance being displayed on said user interface console for selection thereof.

8. The control system as claimed in claim 7, wherein the operation settings include at least one of planter travel speed and seed population.

9. The control system as claimed in claim 7, wherein the optimization process conditions include at least one of range of values for said variable operating parameter, an increment step size and a sensitivity value of the variable operating parameter.

10. The control system as claimed in claim 7, wherein the planter includes a vacuum seed meter.

11. The control system as claimed in claim 7, wherein the variable operating parameter is at least one of a vacuum level and a positive pressure level.

12. The control system as claimed in claim 7, wherein said mechanism includes a seed meter with an adjustable doubles eliminator, said variable operating parameter being a position of the double eliminator.

13. The control system as claimed in claim 7, wherein said controller selects at least one of said measure of planter performance corresponding to the optimum planter parameter, said selected measure of planter performance being displayed on said user interface console.

14. The control system as claimed in claim 7, wherein said user interface console displays each of said measure of the planter performance.

15. The control system as claimed in claim 7, wherein a user selects one of said measure of the planter performance corresponding to the optimum planter parameter.

* * * * *